United States Patent [19]
Hokkanen et al.

[11] Patent Number: 5,986,021
[45] Date of Patent: *Nov. 16, 1999

[54] PROCESS FOR MANUFACTURING LLDPE POLYMERS

[75] Inventors: Harri Hokkanen, Helsinki; Hannu Salminen, Porvoo; Kalle Kallio, Vanhakyla; Hilkka Knuuttila, Porvoo; Ari Palmroos, Kerava, all of Finland

[73] Assignee: Borealis A/S, Lyngby, Denmark

[ * ] Notice: This patent issued on a continued prosecution application filed under 37 CFR 1.53(d), and is subject to the twenty year patent term provisions of 35 U.S.C. 154(a)(2).

[21] Appl. No.: 08/930,696

[22] PCT Filed: Apr. 30, 1996

[86] PCT No.: PCT/FI96/00240

§ 371 Date: Feb. 10, 1998

§ 102(e) Date: Feb. 10, 1998

[87] PCT Pub. No.: WO96/34895

PCT Pub. Date: Nov. 7, 1996

[30] Foreign Application Priority Data

May 2, 1995 [FI] Finland .................................. 952098

[51] Int. Cl.$^6$ .............................. C08F 2/00; C08G 85/00
[52] U.S. Cl. .............................. 526/64; 526/73; 526/160; 526/943; 526/904
[58] Field of Search .............................. 526/64, 73, 160, 526/943

[56] References Cited

U.S. PATENT DOCUMENTS

| | | | |
|---|---|---|---|
| 5,084,534 | 1/1992 | Welborn et al. | 526/160 |
| 5,326,835 | 7/1994 | Ahvenainen et al. | 526/64 |
| 5,391,654 | 2/1995 | Ahvenainen et al. | 526/64 |
| 5,408,017 | 4/1995 | Turner et al. | 526/134 |
| 5,529,965 | 6/1996 | Chang | 502/110 |
| 5,594,078 | 1/1997 | Welch et al. | 526/119 |
| 5,639,834 | 6/1997 | Debras et al. | 526/64 |
| 5,670,589 | 9/1997 | Geerts et al. | 526/160 |
| 5,705,577 | 1/1998 | Rossi et al. | 526/68 |
| 5,714,426 | 2/1998 | Tsutsui et al. | 502/117 |

FOREIGN PATENT DOCUMENTS

| | | |
|---|---|---|
| 663585 | 12/1993 | Australia . |
| 0161060 | 11/1985 | European Pat. Off. . |
| 0571882 | 12/1993 | European Pat. Off. . |
| 87360 | 1/1990 | Finland . |
| 86867 | 12/1990 | Finland . |
| 89929 | 12/1990 | Finland . |
| 930151 | 6/1992 | Finland . |
| 92/12182 | 7/1992 | WIPO . |
| WO92/12182 | 7/1992 | WIPO . |
| 0517183 | 12/1992 | WIPO . |
| WO9302116 | 2/1993 | WIPO . |
| 94/21691 | 9/1994 | WIPO . |

*Primary Examiner*—David W. Wu
*Assistant Examiner*—Roberto Rabago

[57] ABSTRACT

Process for manufacturing ethylene copolymers by polymerizing ethylene and a minor amount of $C_3$–$C_6$ alphaolefins in particle form in slurry reactor in the presence of an ethylene polymerizing catalyst. According to the invention the polymerization is carried out in propane diluent by using a metallocene catalyst activated with an alumoxane compound.

9 Claims, No Drawings

PROCESS FOR MANUFACTURING LLDPE POLYMERS

The invention relates to a process for manufacturing ethylene copolymers, especially linear low density polyethylene polymers having a narrow molecular weight distribution and a narrow composition distribution.

The prior art includes several various processes for manufacturing polyethylene. Thus typical processes are gas-phase and slurry processes. In the latter process the polymerization is typically performed in a reaction medium or diluent, which is formed by isobutane, pentane, hexane or some other saturated aliphatic hydrocarbon. The polymerization is often performed in the presence of a Ziegler-Natta catalyst at an elevated temperature. In addition of monomers, hydrogen is often used as a modifier in the polymerization for affecting the molecular weight of the polymers achieved.

The production of LLDPE materials with traditional Ziegler-Natta catalysts in slurry process is difficult, because the solubility of the polymer is too high due to broad molecular weight distribution and comonomer distribution achieved by traditional Z-N catalysts. This limits strongly the reactor operating temperatures and hence also the productivity of the catalyst. Due to solubility limitations LLDPE materials are normally produced commercially in gas-phase reactors and solution process.

Recent developments in the field of olefin polymerization catalysts include metallocene catalysts, which comprise metallocene compounds of transition metals together with alumoxane compounds. These catalysts have been suggested to be used as a homogenous system or deposited onto carrier, for example inorganic oxide carriers. Thus these catalysts typically comprise as a procatalyst component a metallocene compound, for example bis(cyclopentadienyl)titanium dialkyl or bis(cyclopentadienyl)zirconium alkonyl or chlorides thereof, and an activator component, which typically is alumoxane or an ionic activator.

WO94/21691 describes a process, where ethylene and $C_3$–$C_8$ alpha-olefin are polymerized in a slurry in the presence of a metallocene catalyst. The polymerization is carried out in a stirred tank reactor in an alkane solvent selected from isobutane, pentane or heavier alkanes. Although the publication states that a polymerization temperature of 70–100° C. can be used, the examples of the publication are all carried out in the temperature of 70° C.

Also this process describes only a batch process. There is no indication that a process could be carried out as a continuous process.

It has been found that metallocene catalysts have a property of producing polyethylene having much more narrow molecular weight distribution and much more homogenous comonomer incorporation, which means that all polymer chains will have an equal amount of comonomer and it will be distributed homogenously. Therefore it would be expected that they could be applied for manufacturing in slurry process such LLDPE polymers which would have a relatively narrow molecular weight distribution and narrow composition distribution.

It has also been observed that in a standard slurry process polymer solubility into the diluent in order to produce low density products requires temperatures which are rather low and this results in low production capacity and long and expensive transition periods. Also the operation in standard slurry process has indicated that the productivity of the metallocene catalysts decreases when the reactor temperature is increased. According to the invention it has surprisingly been found out that when the temperature is further increased the productivity of the catalyst can be improved.

Thus the object of the invention is a process for manufacturing ethylene copolymers such as medium weight polymers and linear low density polyethylene by polymerizing ethylene and a minor amount of $C_3$–$C_8$ alphaolefins in particle form in slurry reactor in the presence of an ethylene polymerizing catalyst. The process of the invention is characterized in that the polymerization is carried out in propane diluent in a temperature above 80° C. and that said catalyst is a metallocene catalyst activated with an alumoxane compound.

The use of higher reactor temperature increases the reactivity of the comonomer thus reducing the required amount of the comonomer in the reactor to achieve target density compared to the operation at lower temperatures.

The molecular weight of the produced polymer decreases when reactor temperature is increased. This could be compensated by using higher ethylene concentration in the reactor but it may cause process problems in the traditional slurry processes in form of bubble formation and cavitation in the reactor. According to a preferable embodiment of the invention the use of supercritical conditions (where no phase separation between gas and liquid exists) offers an additional benefit of controlling the produced molecular weight by ethylene concentration. It has been found out that even in a traditional slurry process the molecular weight can be controlled to some extent by ethylene concentration in the reactor. The use of supercritical conditions allows much wider control range of the molecular weight.

The excellent polymer morphology of the products produced with the metallocene catalysts together with the low polymer solubility into the diluent and relatively low diluent density, especially in the supercritical conditions, result on very good settling properties of the polymer and thus efficient reactor operation (i.e. diluent flow into the reactor can be minimized.).

The use of high polymerization temperatures reduces polymer solubility into the diluent enabling the production of low density products in higher reactor temperatures.

Due to the above mentioned benefits the operation efficiency can be drastically improved by operating the reactor using propane diluent, especially in supercritical conditions: higher temperature means higher catalyst productivity, better comonomer reactivity, faster grade changes and efficient operation.

The polymerization is carried out at a temperature, which is above 80° C., preferably above 85° C. According to one embodiment the polymerization is carried out at a temperature and at a pressure, which are above the corresponding critical temperature and pressure points of the mixture formed by ethylene, comonomer, diluent and optionally hydrogen.

The process according to the invention is carried out by continuous slurry process by using propane as reaction medium and a loop reactor as a polymerization reactor. The catalyst, propane, ethylene and comonomer and optionally hydrogen, are fed continuously into the reactor. The reaction mixture is continuously stirred or circulated through the reactor, whereby a slurry of polyethylene and hydrocarbon is formed.

According to one embodiment of the invention the temperature is selected so that it is above the critical temperature of the reaction mixture but below the melting or softening point of the product. Therefore the temperature is selected between 95–110° C., preferably between 96–105° C.

The invention is not limited for the single reactor operation. The control of molecular weight of the polymer by ethylene concentration can be fully utilized when operating two or more reactors in series targeting the production of broad MWD/bimodal polymers. In this particular case the high molecular weight fraction can be produced by having very high ethylene concentration in one of the reactors and the low molecular weight fraction by having low ethylene and high hydrogen concentration in the other reactors.

The density of the polymers is controlled by addition of conomomers to the polymerization. Suitable comonomers to be used according the invention are $C_3$–$C_8$ olefins, preferably butene or 1-hexene.

As a catalyst a metallocene type catalyst is used. As metallocene compounds it is possible to use any kind and type of metallocene. Thus suitable metallocene compounds are those which have a formula $(Cp)_m R_n MR'_o X_p$, where Cp is an unsubstituted or substituted and/or fused homo or heterocyclopentadienyl, R is a group having 1–4 atoms and bridging two Cp rings, M is a transition metal of group 4, 5 or 6 in the Periodic Table of Elements (IUPAC, 1985), R' is $C_1$–$C_2$ hydrocarbyl or hydrocarboxy group and X is a halogen atom, wherein m is 1–3, n is 0 or 1, o is 0–3 and p is 0–3 and sum n+o+p corresponds the oxidation state of the transition metal M. The transition metal M is preferably zirconium, hafnium or titanium, most preferably zirconium. Examples from suitable metallocene compounds are, among others), bis(n-butycyclopentadienyl)zirconium dichloride and bis(indenyl)zirconiumdichloride.

The polymerization activity of the catalyst component described above can be increased by known activator compounds, such as alumoxane compounds. One method is to add the alumoxane compound to the metallocene containing catalyst compound. In that case the alumoxane compound is preferably added by impregnation method, in which a solution of alumoxane compound is impregnated into the catalyst component. The amount of such solution is preferably not greater than the total free pore volume of the catalyst compound already containing the metallocene compound. After impregnation the solvent can be removed for example by evaporation. Another method for applying activator compounds is to add it straight into the polymerization reactor along with the metallocene containing catalyst component.

Suitable activators are for example alumoxane compounds having a formula R—(Al(R)—O)$_n$—AlR$_2$ or (—Al(R)—O—M)$_m$, where n is 1–40, m is 3–40 and R is a $C_1$–$C_8$ alkyl group. Preferably R is a methyl group.

The support or carrier material used in the method according to the invention may be any porous, substantially inert support, such as an inorganic oxide or salt. In practice the support used is preferably a fine-grained inorganic oxide such as an inorganic oxide of an element of Group 2, 13 or 14 in the Periodic Table of Elements (IUPAC, 1985), most preferably silica, alumina or a mixture or derivative of these. Other inorganic oxides which can be used either alone or together with silica, alumina or silica-alumina, are magnesium oxide, titanium dioxide, zirconium oxide, aluminum phosphate etc.

The support used in the method is preferably dry. In general, metal oxide supports also contain surface hydroxyl groups which may react with metallocene or alumoxane. Therefore the support can be dehydrated or dehydroxylated before use. Such treatment may be either a thermal treatment or a reaction between the surface hydroxyl groups of the support and a reagent contacted with it.

Preferable support materials to be used according to the invention are porous silica or alumina carriers. The pore volume is not critical and can be varied within rather wide limits, but normally in commercial support materials the pore volume is preferably approx. 0.9–3.5 ml/g.

The process according the invention has several advantages over the prior art slurry processes. By using metallocene catalysts a more narrow molecular weight distribution and more homogenous comonomer distribution is achieved, which is desirable in LLDPE products. By using propane diluent and especially a polymerization temperature and pressure which are above the critical points of the reaction mixture, the polymerizing activity of the catalyst can surprisingly be increased. The lowering effect on the molecular weight because of high temperatures can be eliminated by using high ethylene concentrations, which in the invention does not cause processing problems, such as bubble formation. Further the molecular weight can be regulated by varying the amount of hydrogen added into the polymerization. Further the desired low densities can be achieved by using lower amounts of comonomer in the polymerization.

The invention is further illustrated by accompanying examples where metallocene catalysts were used in the polymers under subcritical and under supercritical conditions.

Example 1

Catalyst Preparation 26.78 kg of silica calcined at 600° C. for 4 hours was placed in 150 dm$^3$ reactor equipped with an effective stirrer. A complex solution containing MAO and metallocene was prepared as follows: 295 g of bis(n-butyl-cyclopendienyl) zirconium dichloride was dissolved in 6.5 kg of dried and deoxygenated toluene. To this metallocene solution 29.1 kg of 30 wt-% MAO in toluene was added and mixed. This solution containig MAO and metallocene was then added to the silica and after adding the stirring was continued for two hours before evaporation of toluene was started. The Al and Zr-contents of the final catalyts were 8.8 and 0.12 w-% respectively. The toluene content of the final catalyst was 2.4-%.

Polymerizations

Polymerizations were done in 2 dm$^3$ stainless steel reactor equipped with paddle stirrer. 1 dm$^3$ of dried and deoxygenated propane was first introduced into the reactor at room temperature. After adding the catalyst the reactor was heated up to desired temperature. Then ethylene and hexene and optionally hydrogen was fed simultaneously to the reactor. The partial pressure of the monomer and hydrogen was kept by continuously feeding ethylene to the reactor. After 1 hour the polymerization was stopped rapidly by venting off the ethylene and cooling down the reactor.

Example 1 (comparison)

105 mg of catalyst described above was used in the polymerization. The polymerization temperature was 70° C. and ethylene partial pressure was 10 bar. 60 ml of hexene was used in the polymerization. After 1 hour 147 g of ethylene-hexene copolymer was obtained. The molecular weight of the polymer was 100,000 and the molecular weight 2.65 determined with GPC. The density of the copolymer was 930.8 kg/M$^3$. Hexene content in the polymer was 2.5 w-% (FTIR).

Example 2 (comparison)

Polymerization was done as in Example 1, but 95 mg of catalyst was used and the polymerization temperature was raised to 80° C. 88 grams of ethylene-hexene copymer was obtained. The density of the polymer was 927.7 kg/m$^3$. The hexene content in the polymer was 2.9 w-% determined with FTIR.

Example 3

Polymerization was carried out as in Example 1, except that 263 mg catalyst was used and the polymerization temperature was increased to 85° C. Ethylene partial pressure was 5 bar and 20 ml butene was added. After the reaction has proceeded for 52 minutes, 312 g of polymer was collected, with MFR$_2$ 1,7 and density 926.4. The butene content of the polymer was measured to be 2.9 w-%.

Example 4

Polymerization was carried out as in. Example 3, except that the polymerization temperature was increased to 90° C. Ethylene partial pressure was 5 bar and 20 ml butene was added. After the reaction has proceeded for 40 minutes, 326 g of polymer was collected, with MFR$_2$ 1,5 and density 922.7. The butene content of the polymer was measured to be 3.7 w-%.

Example 5

Polymerization was done as in Example 1, but 205 mg of catalyst was used and the polymerization temperature was raised to 96° C., ethylene partial pressure was only 5 bar and 30 ml of hexene was used. 379 grams of ethylene-hexene copolymer was obtained with molecular weight of 110,000 and MWD of 2.50. The density of the polymer was 925.1 kg/m$^3$ and hexene content in the polymer was 3.5 w-% determined with FTIR.

The examples are illustrated in the following table:

| Ex. | Temp. °C. | C$_2$-pressure bar | Co-monomer ml | Activity kg PE/g/h | M/W g/mol | M$_w$/M$_n$ | Density kg/m$^3$ | Co-monomer comment w-% |
|---|---|---|---|---|---|---|---|---|
| 1 comp. | 70 | 10 | 60 hexene | 1.40 | 100000 | 2.65 | 930.8 | 2.5 |
| 2 comp. | 80 | 10 | 60 | 0.93 | n.a. | n.a. | 927.7 | 2.9 |
| 3 | 85 | 5 | 20 butene | 1.40 | n.a. | n.a | 926.4 | 2.9 |
| 4 | 90 | 5 | 20 butene | 2.3 | n.a. | n.a. | 922.7 | 3.7 |
| 5 | 96 | 5 | 30 hexene | 1.85 | 110000 | 2.5 | 925.1 | 3.5 |

These examples clearly show that it is possible to achieve better activities of the catalyst and lower density when temperature is increased over 80° C., and more comonomer in the product is achieved with lower comonomer content in the polymerization.

We claim:

1. A process for manufacturing ethylene copolymers which comprises polymerizing ethylene and a minor amount of C$_3$–C$_6$ alpha olefins in particle form in a slurry reactor in the presence of an ethylene polymerizing catalyst, wherein polymerizing is carried out in a propane diluent containing ethylene, said C$_3$–C$_6$ alpha olefin and optionally hydrogen, at a temperature above the critical temperature of the mixture, but below the softening temperature of the polymer and at a pressure above the critical pressure of the mixture and said catalyst is a metallocene catalyst activated with an alumoxane compound, said ethylene copolymers having a density of between 910–928 kg/m$^3$.

2. Process according to claim 1, which is carried out continuously in at least one loop reactor.

3. Process according to claim 1, wherein said catalyst is formed from a metallocene having a formula (Cp)$_m$R$_n$MR'$_o$X$_p$, where Cp is an unsubstituted or substituted and/or fused homo or heterocyclopentadienyl, R is a group having 1–4 atoms and bridging two Cp rings, M is a transition metal of group 4, 5 or 6 in the Periodic Table of Elements (IUPAC, 1985), R' is C$_1$–C$_2$ hydrocarbyl or hydrocarboxy group and X is a halogen atom, wherein m is 1–3, n is 0 or 1, o is 0–3, p is 0–3 and sum n+o+p corresponds the oxidation state of the transition metal M.

4. Process according to claim 3, wherein M is zirconium, hafnium or titanium.

5. Process according to claim 4, wherein said metallocene compound is bis(n-butylcyclopentadienyl)zirconium dichloride or bis(indenyl)zirconiumdichloride.

6. Process according to claim 3, wherein the catalyst is activated with an alumoxane compound having a formula

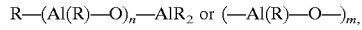

R—(Al(R)—O)$_n$—AlR$_2$ or (—Al(R)—O—)$_m$, where n is 1–40, m is 3–40 and R is a C$_1$–C$_8$ alkyl group.

7. Process according to claim 3, wherein said catalyst is supported on a porous organic or inorganic carrier material.

8. Process according to claim 1, wherein polymerization is carried out at a temperature of 95–110° C. and at a pressure above 50 bar.

9. Process according to claim 1, wherein the polymer product has a M$_w$/M$_n$ of 2–3.

* * * * *